Figures 1, 2:
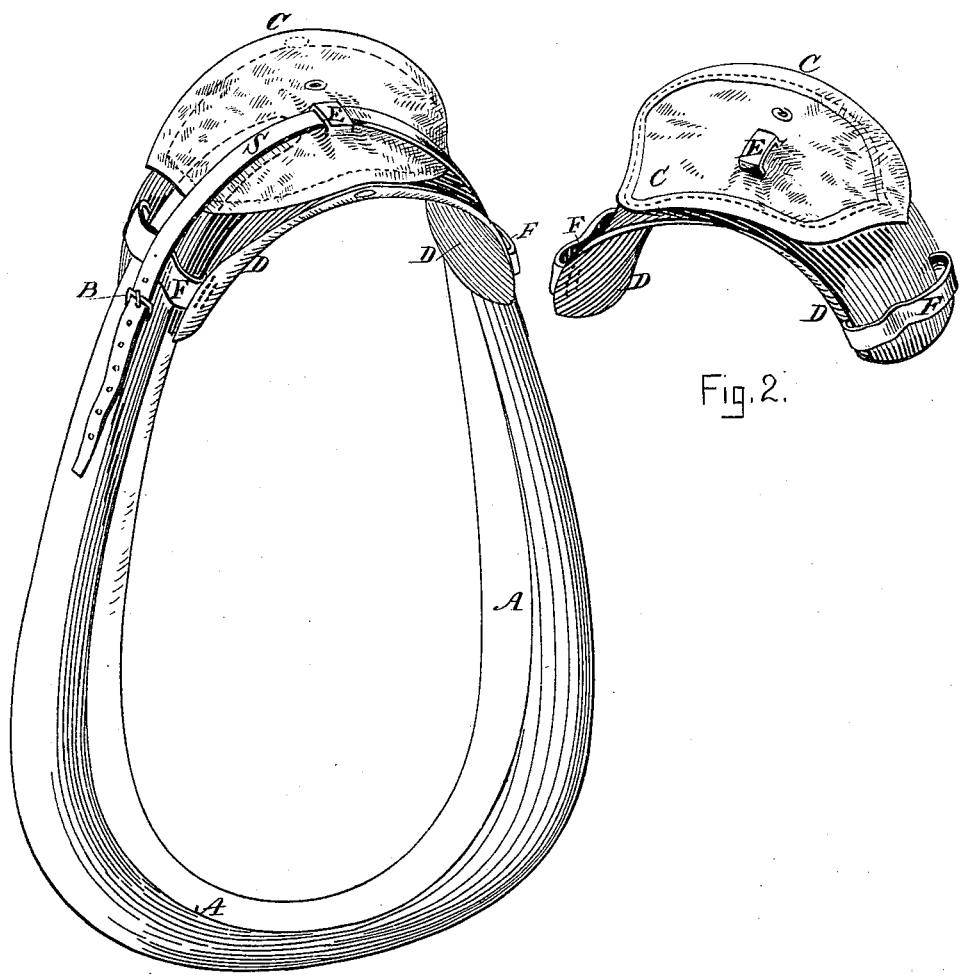

(No Model.)

J. P. W. ROACH.
HORSE COLLAR.

No. 269,598.                     Patented Dec. 26, 1882.

Witnesses:
E. A. Phelps
A. F. Towne

Inventor,
Jeremiah P. W. Roach
by A. N. Pierce
his Attorney

UNITED STATES PATENT OFFICE.

JEREMIAH P. W. ROACH, OF CONCORD, NEW HAMPSHIRE, ASSIGNOR OF ONE-HALF TO JOSIAH E. DWIGHT, OF SAME PLACE.

HORSE-COLLAR.

SPECIFICATION forming part of Letters Patent No. 269,598, dated December 26, 1882.

Application filed October 5, 1882. (No model.)

*To all whom it may concern:*

Be it known that I, JEREMIAH P. W. ROACH, a citizen of the United States, residing at Concord, in the county of Merrimack and State of New Hampshire, have invented certain new and useful Improvements in Open Horse-Collars; and I do hereby declare that the same are fully described in the following specification and illustrated in the accompanying drawings.

The object of this invention is to furnish an open horse-collar adjustable to fit the necks of horses of different sizes by means of a connecting-strap with a combined cap and chafe, detachable together from the strap and collar, the chafe being permanently shaped to to the back of the animal's neck, and movable toward and from the bottom of the collar by shortening and lengthening the confining-strap.

My invention consists in such combined cap and chafe for open horse-collars, and it is embodied in a horse-collar open at the top, and provided at that point with said cap and chafe movable upon and detachable together from said collar and its connecting-strap.

In the drawings, Figure 1 represents an open collar provided with my improvement. Fig. 2 shows the cap and chafe detached from the collar.

The collar A is open at the top, not having the ordinary continuous curve and unvarying form; but its upwardly-extending sides are connected at the top only by a strap, S, and buckle B, adapted to enlarge or diminish the size of the collar, and to readily adjust it to horses' necks of different sizes. The upper ends of the collar are shown in dotted lines.

To conceal the upper ends of the collar and prevent them from rubbing on the animal's neck, I provide a cap, C, and chafe D, permanently united to each other, and arranged as shown. The chafe is curved centrally to fit the back of a horse's neck, and extends each way therefrom, so as to lie between his neck and the ends of the collar. The cap, secured to the chafe centrally, extends both ways from the center over the upper ends of the collar, which are received between the parts C and D.

The strap S is shown as passing over the top of the cap through a loop, E, so as to hold the cap and chafe in position at the top of the collar. The size of the collar may therefore be increased or decreased by slipping the strap one way or the other through this loop and fastening it by the buckle B.

It is obvious that the strap may, if preferred, be passed between the cap and chafe, and still leave them adjustable upon it. In either case the chafe once shaped to a horse's neck requires no reshaping when the collar is enlarged or dimished, but is merely raised or lowered by adjusting the length of the strap. This is a material improvement over open collars having flaps made fast to the sides and folded in against the animal's neck, thus necessitating a new bearing-point with every change in size. My plan is also much simpler and the device more ornamental than those heretofore used, which conceal the upper ends of open collars by inserting them into a leather tube bent over the animal's neck, and held in place by a strap. I disclaim such construction, since it is very unsightly in appearance, and the inner portion of the pad will be necessarily wrinkled when in use, causing much pain to the horse. The peculiarity of my device is that it is open at both sides and ends, the cap and chafe being made of separate pieces, and only united at a transverse central plane. The chafe is in practice of soft flexible leather, and the cap comparatively rigid. The chafe follows the curves of the animal's neck without wrinkles; but the cap may, as shown, have a dissimilar shape of ornamental configuration.

I usually attach to the wings of the chafe loops F, through which the upper ends of the collar are passed, said loops being pressed down by the hames when in use into the recesses of the collar, thus holding the chafe and cap firmly.

I claim as my invention—

1. As a new article of manufacture, a combined cap and chafe for open horse-collars, the same being united centrally, open at the sides and ends, and together detachable from the collar and adjustable thereon, substantially as set forth.

2. An open horse-collar having its upwardly-projecting sides provided respectively with a strap and buckle, in combination with a united cap and chafe, made the one rigid and the other flexible with open sides, and arranged to receive between them the upper ends of the collar, substantially as set forth.

In testimony whereof I hereto affix my signature in presence of two witnesses.

JEREMIAH P. W. ROACH.

Witnesses:
WALTER J. COFFIN,
R. N. PHILBRICK.